UNITED STATES PATENT OFFICE.

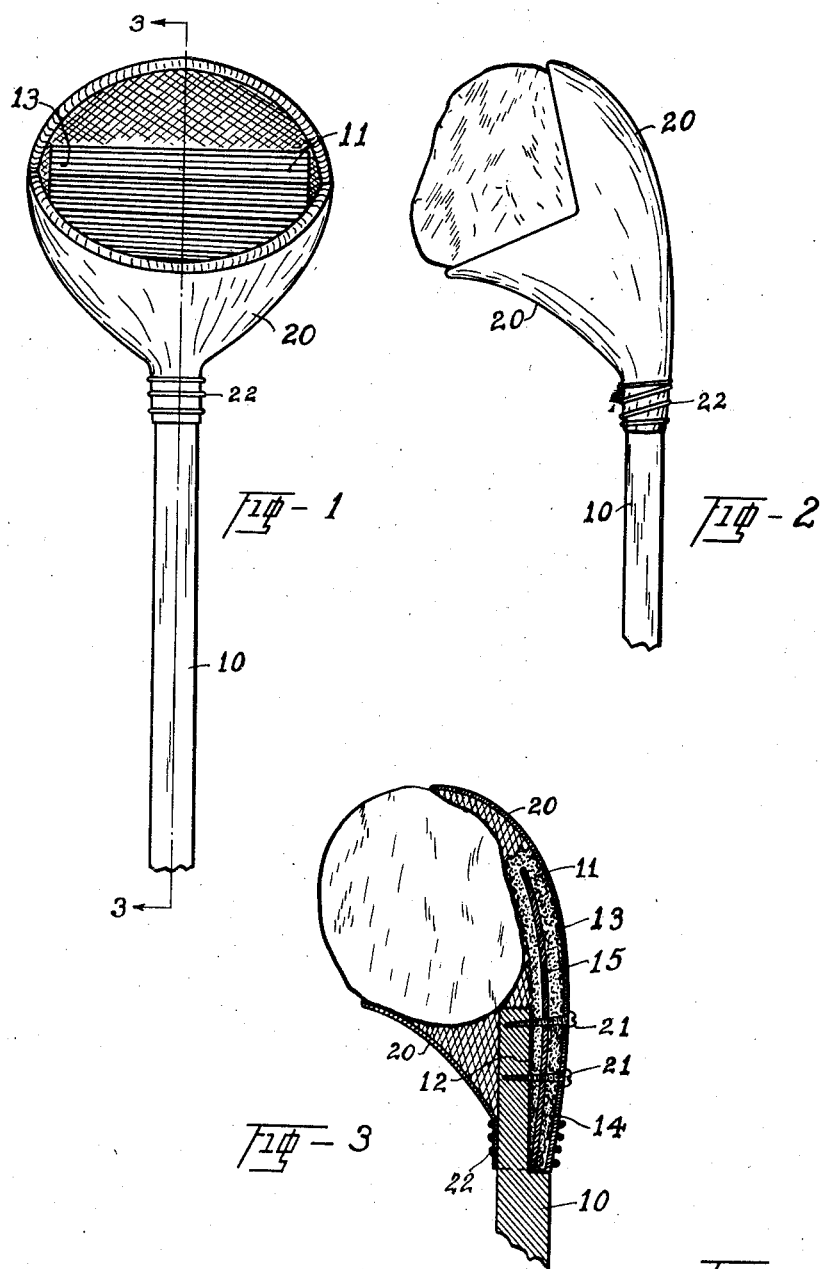

ELIZABETH JORDAN, OF CLEVELAND, OHIO.

HOLDER FOR WALL-PAPER CLEANERS.

1,357,060. Specification of Letters Patent. Patented Oct. 26, 1920.

Application filed May 21, 1920. Serial No. 383,103.

*To all whom it may concern:*

Be it known that I, ELIZABETH JORDAN, a citizen of the United States, residing at Cleveland, in the county of Cuyahoga and State of Ohio, have invented a certain new and useful Improvement in Holders for Wall-Paper Cleaners, of which the following is a full, clear, and exact description, reference being had to the accompanying drawings.

This invention relates to holders for wall paper cleaner, particularly to that type of holder which enables an operator to clean the ceiling of a room while he stands upon the floor of a room.

Heretofore the practice of cleaning a wall with a mass of cleaning dough has been beset with difficulties. These have been, first, to obtain a device which would not grip the material, thereby causing it to be squeezed out of the holder, and second, to obtain a receptacle that would not permit the cleaning dough to roll out of the holder.

The primary object of my invention is to provide means whereby the operator may clean the surfaces of a wall or ceiling while the operator stands upon the floor. Other objects include a holder that will retain a mass of cleaning dough, without subjecting it to excessive compressive force and that will not allow the dough to roll out over the edges of holder.

In the drawings Figure 1 is an elevation of the holder embodying the feature of my invention; Fig. 2 is a side elevation of the holder shown in Fig. 1; Fig. 3 is a section taken on the line 3—3 as shown in Fig. 1.

Designating the parts by the use of reference characters, in Fig. 1, 10 represents a supporting stick or handle to one end of which is secured means for holding the cleaning dough, while the other end is adapted to be held by the operator. This handle may be constructed of wood, or metal tubing, and may be of a length sufficient for the operator to reach the ceiling of the room in which he is standing.

Rigidly secured to the upper end of the handle 10 is a strip of corrugated rubber 11, which is positioned on one side of the upper nd of the handle 10, and in abutting engagement with a flat surface 12, on the handle 10. The flat surface may be obtained by cutting away a portion of a round handle, or the handle itself may be rectangular in cross section. The corrugated member 11 has a portion thereof bearing upon the flat surface of the handle to prevent it from sliding around the same; then it extends upwardly beyond the end of the handle and is bent backward upon itself. The member 11, may have corrugations 13, on only one side while the opposite side may be a flat surface as at 14. The corrugations serve to hold a mass of cleaner by frictional contact therewith.

Within the pocket formed by bending the friction strip upon itself there may be inserted a flat strip of metal 15, which constitutes a reinforcing member. This member is preferably a thin flexible strip, substantially complementary to the form of the friction strip, whereby it serves to strengthen the corrugated rubber at all points.

To prevent excessive flexibility of the supporting means, an outer casing 20, preferably of rubber or any flexible material, is rigidly secured at the upper end of the handle 10, in such a manner that it abuts the corrugated member 11, and embraces the upper end of the handle 10. At the outer end, the member 20 has a flared opening sufficient to hold a given quantity of cleaning dough. The soft flexible material which comprises the outer casing enables the operator to use my device without scratching or marring the wall-paper, while at the same time it enables him to clean the corners of a room, without resorting to other means.

The entire outer casing may be covered with any suitable material, such as cloth, to present an attractive appearance. The members 11, 15 and 20 may then be rigidly attached to the handle 10, by screws 21 and wire 22.

To use this device the operator kneads a quantity of cleaning dough until it becomes a soft pliable mass. He then inserts it in the holder and presses it firmly therein until a portion of the dough becomes embedded partly in the corrugations of the member 11 and partly in the flared opening of the outer casing. Assuming that the handle has a length sufficient to enable the operator to stand upon the floor and to reach the ceiling of the room in which he is standing, then to clean a surface it is only necessary to make sweeping strokes thereon. This operation can be continued until the dust and dirt on the wall has been embedded into the contact surface of the cleaning dough. Then the device can be lowered, the cleaning dough removed and worked by the operator until a cleaning surface is again presented to the wall.

The advantages of my invention are that it can be used to clean the walls and ceiling of a room without the necessity of a step ladder or other means to enable the operator to be within reach of the ceiling; and that it constitutes a rigid yet flexible device.

Having thus described my invention, I claim:

1. In a holder for wall paper cleaner, the combination with a handle of an open flexible receptacle secured at one end of said handle and flared outwardly to hold a mass of cleaning dough.

2. In a holder for wall paper cleaner, the combination with a handle of a receptacle adapted to hold a mass of cleaning dough, said receptacle comprising flexible retaining walls secured to said handle, and means associated with the receptacle for presenting an uneven surface to the cleaning dough.

3. In a holder for wall paper cleaner, the combination with a handle of a receptacle having flexible retaining walls and a friction strip adjacent one side of said receptacle.

4. In a holder for wall paper cleaner, the combination with a handle of a receptacle having flexible retaining walls, a corrugated friction strip inserted therein and adapted to securely hold a mass of cleaning dough.

5. In a device of the class described, the combination with a handle of an open receptacle having flexible retaining walls, a friction strip comprising a corrugated sheet of rubber bent upon itself within said walls and means for rigidly securing said strip and receptacle to the handle.

6. In a device of the class described, the combination with a handle of a receptacle secured at one end of said handle and having a flared opening adapted to receive a mass of cleaning dough, a flexible member within said receptacle and a friction strip adapted to embrace the said flexible member to retain the cleaning dough in position.

7. In a holder for wall paper cleaner, the combination with a handle of a friction strip comprising a strip of corrugated material bent upon itself, a reinforcing member adjacent the said friction strip, a flexible receptacle adapted to receive a mass of cleaning dough and means for securing said friction strip to the handle.

8. In a holder for wall paper cleaner, the combination with a handle of a friction strip, comprising a strip of corrugated material secured at one end of said handle, a reinforcing member adjacent the said strip and comprising a strip of hard flexible material rigidly secured to a flat bearing surface in said handle and an open receptacle comprising a funnel shaped section of rubber rigidly secured to the handle and embracing the upper end thereof, said receptacle having a flared opening adapted to receive and support a mass of cleaning dough.

In testimony whereof, I hereunto affix my signature.

ELIZABETH JORDAN.